United States Patent [19]
Vanderleeden

[11] 3,838,358
[45] Sept. 24, 1974

[54] LASER ARRANGEMENTS INCLUDING CATADIOPTRIC ELEMENTS MADE FROM GRADED-INDEX OPTICAL FIBERS
[75] Inventor: Johannes Cornelis Vanderleeden, Summit, N.J.
[73] Assignee: Bell Telephone Laboratories, Incorporated, Murray Hill, N.J.
[22] Filed: Apr. 30, 1973
[21] Appl. No.: 355,968

[52] U.S. Cl. .......................... 331/94.5, 350/175 GN
[51] Int. Cl. ............................................... H01s 3/08
[58] Field of Search..... 331/94.5; 350/175 GN, 199, 350/96 WG

[56] References Cited
UNITED STATES PATENTS
3,680,000  7/1972  Chesler et al...................... 331/94.5
3,718,383  2/1973  Moore........................... 350/175 GN Primary Examiner—William L. Sikes
Attorney, Agent, or Firm—L. C. Canepa

[57] ABSTRACT

A catadioptric element (which is equivalent in effect to a spherical mirror) is made by depositing a high-reflectivity coating on one of the flat ends of a cylindrical segment of a graded-index optical fiber. All of the usual laser configurations requiring cavity-defining spherical mirrors can be constructed by using one or two such segments.

2 Claims, 12 Drawing Figures

LASER ARRANGEMENTS INCLUDING CATADIOPTRIC ELEMENTS MADE FROM GRADED-INDEX OPTICAL FIBERS

BACKGROUND OF THE INVENTION

This invention relates to mirror structures and, more particularly, to such structures made from graded-index optical fibers.

A recently developed miniature laser structure includes an Nd:YAG rod that is 0.5 centimeters long and only 0.04 centimeters in diameter. The spherical end mirrors required for such a small structure can be made as separate contoured elements or formed integrally with the laser rod by grinding spherical surfaces on the ends thereof. In either case it is apparent that the task of fabricating cavity-defining spherical mirrors whose sizes are compatible with such miniature active elements is a difficult one.

SUMMARY OF THE INVENTION

Accordingly, an object of the present invention is an improved mirror structure.

More specifically, an object of this invention is an easily fabricated small spherical mirror element adapted to be used as a cavity-defining mirror in a miniature laser configuration.

Briefly, these and other objects of the present invention are realized in a specific illustrative embodiment thereof that comprises a cylindrical segment of a very-small-diameter graded-index optical fiber. One flat end of the segment is coated with a high-reflectivity material to form a planar mirror surface. This planar mirror in combination with the graded-index segment (which is in effect a thick lens) is equivalent to a spherical mirror. Such a coated segment may be designated a catadioptric element, that is an optical element that both refracts (graded-index segment) and reflects (planar mirror). Miniature and other laser configurations requiring concave or convex cavity-defining spherical mirrors are made feasible by combining one or two such coated segments with an active laser medium.

BRIEF DESCRIPTION OF THE DRAWING

A complete understanding of the present invention and of the above and other objects thereof will be gained from a consideration of the following detailed description of several specific illustrative embodiments thereof presented hereinbelow in connection with the accompanying drawing in which.

DETAILED DESCRIPTION

Light-focusing rods and fibers of the type described, for example, in A. D. Pearson, W. G. French and E. G. Rawson, *Applied Physics Letters*, 15, page 76 (1969), are characterized by a graded index of refraction. More specifically, a typical such fiber with a circular cross section exhibits an index of refraction $n$ that decreases with the distance $r$ from its center according to the relationship $$n = n_0(1 - 2r^2/b^2)$$

1.

where $n_0$ is the index of refraction at the center of the fiber and $b$ is a parameter of the graded-index material of the fiber.

It can be shown that a piece (a cylindrical segment) of a graded-index fiber or rod (represented as element 10 in FIG. 1) acts as a thick lens with a focal length $f$ that is determined by the parameter $b$ and the length $l$ of the piece. Assuming that the graded-index segment 10 is embedded in a isotropic medium having an index of refraction $n_1$, the parameters of the equivalent thick lens are $$f = K/\sin(\theta/2)$$
$$s_1 = k \cot(\theta/2)$$

2

Figure 1:
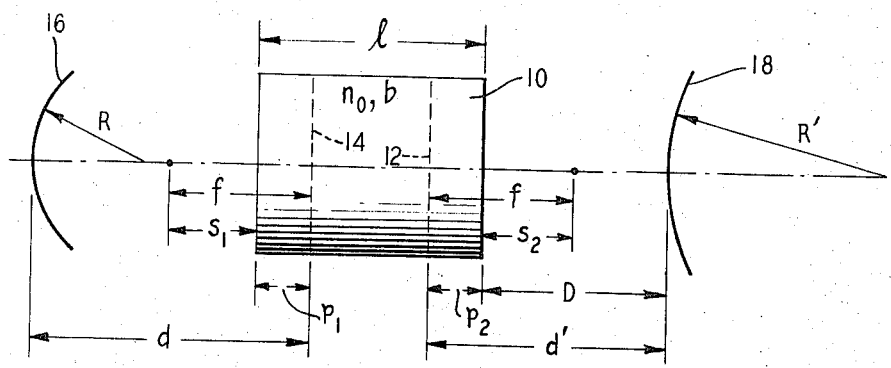
FIG. 1 shows a graded-index fiber (or rod) combined with a mirror element to form an equivalent mirror.

$s_2 = K \cot(\theta/2)$ where $f$, $s_1$ and $s_2$ are represented in FIG. 1, $K$ equals $bn_1/2n_0$, $\theta$ equals $4l/b$ and $f$ is measured from the so-called principal planes 12 and 14 (FIG. 1) of the lens-like piece 10. In addition, as is evident from FIG. 1, $f$ equals $s_1 + p_1 = s_2 + p_2$.

In FIG. 1 a conventional spherical mirror 16 having a radius of curvature $R$ is shown located a distance $d$ to the left of the principal plane 14 of the element 10. This combination of the element 10 and mirror 16 is equivalent to a spherical mirror 18 having a radius of curvature $R'$ located a distance $d'$ from the principal plane 12. $R'$ and $d'$ can be determined from equations (2) and the additional relationships (3a) and (3b).

$$1/d + 1/d' = 1/f$$

3a.

$$1/(d-R) + 1/(d'+R') = 1/f.$$

3b.

The sign convention employed herein for the radii of curvature of the mirrors shown in FIG. 1 is that $R > O$ for a concave mirror and that the FIG. 1 depiction is viewed from the right. Accordingly, in FIG. 1 the object and image mirrors 16 and 18, respectively, are both concave.

Consider the special case wherein $R = \infty$ and $d = p_1$. To satisfy these conditions the left side of the element 10 of FIG. 1 is made a flat mirror surface. This is accomplished by depositing a high reflectivity coating, for example, a periodic dielectric multi-layer, directly on the left side of the cylindrical segment 10. The resulting equivalent spherical image mirror (corresponding to the mirror 18) constitutes a spherical graded-index mirror made in accordance with the principles of this invention.

For the aforementioned special case, we have from equations (2) that $$d = p_1 = f - s_1 = {}_K \tan(\theta/4). \qquad 4.$$

The location of the image mirror is found from (3a) as $$d' = df/(d-f) = -df/s_1 = -K \tan(\theta/4)/\cos(\theta/2). \qquad 5.$$

Therefore the distance of the image mirror from the righthand side of the element 10 is $$D = d' - p_2 = -K \tan(\theta/4)\,[1/\cos(\theta/2) + 1] = -K \tan(\theta/2). \qquad 6.$$

The radius of curvature $R'$ is obtained from (3b) by setting $R = \infty$ i.e., $$R' = f - d = -f^2/(d-f) = f^2/s_1 = K/[\sin(\theta/2)\cos(\theta/2)] = 2K/\sin\theta. \qquad 7.$$

Accordingly $R' > 0$ (concave image mirror)

$D < 0$ (image left of right-side of lens 10) $0 \leq \theta < \pi$ $$8a.$$

and $R' < 0$ (convex image mirror)

$D > 0$ (image right of right-side of lens 10)

$\pi \leq \theta < 2\pi$ $$8b.$$

If $2a_0$ is the diameter of the object mirror (equal to the diameter of the graded-index rod 10 in FIG. 1), then the diameter of the image mirror is found from (4) and (5) as $$2a'_0 = 2Ma_0, \qquad 9a.$$

with $$M = |d'/d| = |1/\cos(\theta/2)|. \qquad 9b.$$

Equations (6), (7), (8a), (8b), (9a) and (9b), summarize all the properties of spherical graded-index mirrors that are needed in determining the stability conditions of a resonant cavity in which such segments replace ordinary spherical mirrors.

It is known that the diffraction losses and the stability properties of a resonant cavity can be described by the Fresnel number $N$ and the g-parameters, $$N = a_1 a_2/\lambda L$$

$$g_1 = a_1/a_2(1 - L/R_1)$$

$$g_2 = a_2/a_1(1 - L/R_2). \qquad 10.$$

Here $2a_1$ and $2a_2$ are the respective mirror diameters, $R_1$ and $R_2$ are their respective radii of curvature and $L$ is their separation.

Figure 2:
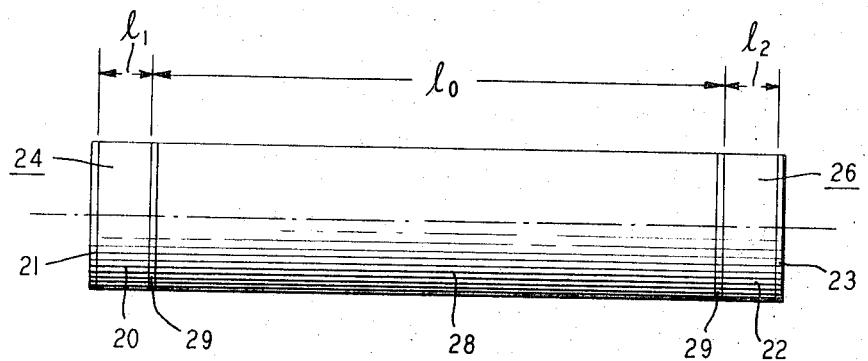
FIG. 2 depicts a specific laser configuration including two spherical mirrors made in accordance with the principles of the present invention.

Consider now the cavity of FIG. 2, comprising two graded-index elements 20 and 22, each with diameter $2a_0$ and with lengths $l_1$ and $l_2$, respectively, which are separated by a distance $l_0$. The elements 20 and 22 are coated with high-reflectivity layers 21 and 23, respectively, thereby to form two sphercal graded-index mirrors 24 and 26 made in accordance with the principles of the present invention. The space between the graded-index mirrors is assumed filled with a medium 28 of index $n_1$, which may be gaseous or solid. Since in general $n_1 \neq n_0$, the ends of the graded index mirrors which face the cavity are anti-reflection coated (layer 29 in FIG. 2) to minimize reflection losses. Alternatively, if the space between the graded-index mirrors is completely filled with a solid-state laser medium 28 of index $n_1$ (for instance a rod of Nd:YAG), then the antireflection coatings may be deposited on the respective ends of the laser medium.

Advantageously, antireflection coatings are included in all the subsequent embodiments to be described. However, in the interest of not unduly cluttering the drawing, and since the requirement for and placement of such coatings are well known in the art antireflection coatings will not be explicitly shown and described hereinafter.

Figure 3:
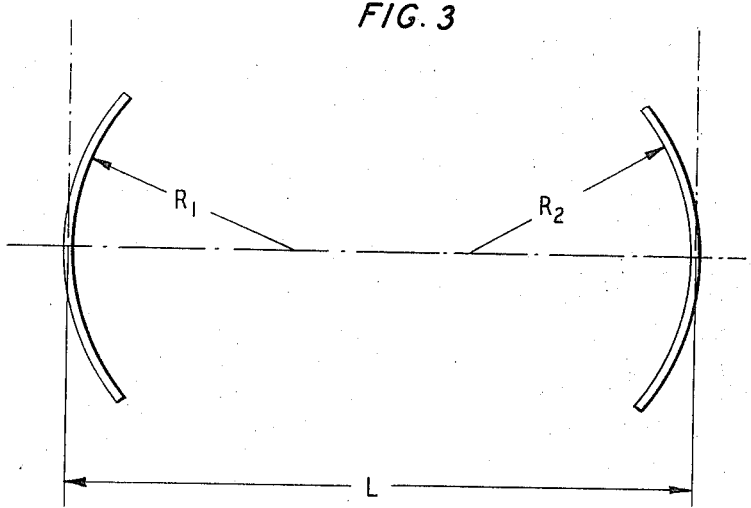
FIG. 3 illustrates the equivalent resonant cavity formed by the FIG. 2 arrangement.

The cavity of FIG. 2 is equivalent to that of FIG. 3, and its properties are described by (10) if the parameters in (10) are understood to refer to the graded-index mirrors 24 and 26 and to the medium filling the cavity. We thus set $$a_1 = M_1 a_0$$

$$a_2 = M_2 a_0$$

$$L = l_0 - (D_1 + D_2) \qquad 11.$$

$$\lambda = \lambda_{vac}/n_1,$$

with $D$, $R$ and $M$ given by (6), (7) and (9b). $\lambda_{vac}$ is the wavelength in vacuum. Use of (6), (7), (9b) and (11) in (10) gives $$N = n_1 a_0^2/[\lambda\{l_0 + K(\tan(\theta_1/2) + \tan(\theta_2/2))\}\cos(\theta_1/2)\cos(\theta_2/2)] \qquad 12.$$

and $$g_1 = |\cos(\theta_2/2)/\cos(\theta_1/2)| \times [1 - \{l_0 + K(\tan(\theta_1/2) + \tan(\theta_2/2))\}\sin\theta_1/2K], \qquad 13.$$

with a similar expression for $g_2$. Equations (12) and (13) are subject to the constraint that $L \geq 0$, i.e., $$l_0 \geq 0 \tag{14a}$$

and $$l_0 + K\{\tan(\theta_1/2) + \tan(\theta_2/2)\} \geq 0. \tag{14b}$$

Stable operation of a resonator cavity without excessive diffraction losses requires that $$0 \leq g_1 g_2 \leq 1 \tag{15a}$$

and $$N \geq 1. \tag{15b}$$

Equations (15a) and (15b) impose certain constraints on the allowed sets of values of $l_0$, $\theta_1$ ($l_1$) and $\theta_2(l_2)$ of FIG. 2. In particular consider the following special cases.

Symmetric Resonator ($g_1 = g_2$)

The structure is as illustrated in FIG. 2, with $l_1 = l_2 = l$. In the equivalent resonator of FIG. 3, $R_1 = R_2$. From (12) we get for $N$, $$N = n_1 a_0^2 / [\lambda\{l_0 + 2K \tan(\theta/2)\}\cos^2(\theta/2)]. \tag{16}$$

The g-parameters are [from (13)], $$g_1 = g_2 = g = [1 - \{l_0 + 2K \tan(\theta/2)\}\sin\theta/2K]$$
$$= \cos\theta - Q\sin\theta \tag{17}$$

with $Q \equiv l_0/2K$, while the constraint (14) leads to $Q \geq 0$ and $Q \geq -\tan(\theta/2)$. Substitution in (15) gives the stability condition as $$0 \leq [\cos\theta - Q\sin\theta]^2 \leq 1 \tag{18}$$

subject to $Q \geq 0$ and $Q \geq -\tan(\theta/2)$.

Half-concentric Resonator ($g_1 = 0, g_2 = g$)

Figure 4:
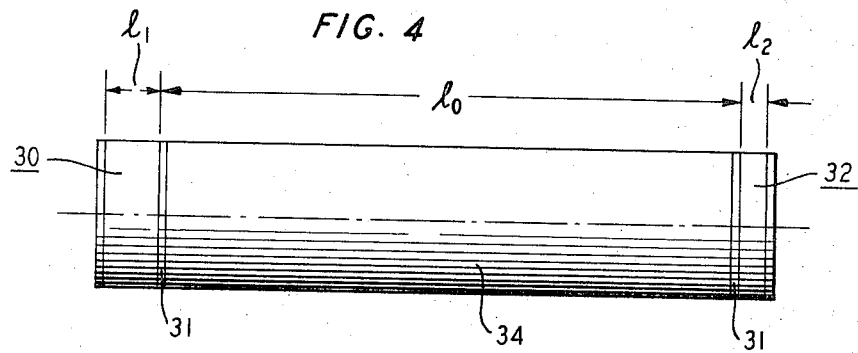
FIGS. 4 and 6 each show another specific illustrative laser configuration including two spherical mirrors made in accordance with this invention.
Figure 5:
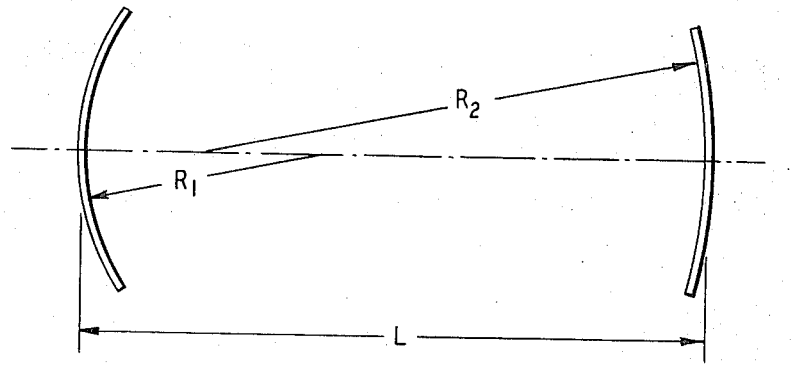
FIGS. 5 and 7 depict the equivalent cavities of the structures shown in FIGS. 4 and 6, respectively.

The resonator configuration is shown in FIGS. 4 and 5 ($R_1 \neq R_2$), with graded-index spherical mirrors 30 and 32 attached to the respective ends of an active laser rod 34. We put an additional constraint on one of the g-parameters, namely, $g_1 = 0$. It follows from (13) that $g_1 = 0$ if the quantity in square brackets vanishes, i.e., we require $$l_0 + K\{\tan(\theta_1/2) + \tan(\theta_2/2)\} = 2K/\sin\theta_1 \tag{19a}$$

or $$Q = 1/\sin\theta_1 - \{\tan(\theta_1/2) + \tan(\theta_2/2)\}/2. \tag{19b}$$

Upon combining this with the constraints (14a) and (14b) we have the following restriction on $\theta_1$, $$0 \leq \theta_1 \leq \pi, \tag{20}$$

i.e., the spherical graded-index mirror 30 of FIG. 4 is concave (as represented in FIG. 5). The other mirror (32 in FIG. 4) may be either concave or convex. (It is concave as represented in FIG. 5.) (19a), (19b) and (20) can be solved for the allowed set ($\theta_1$, $\theta_2$) if we know Q. A commercially available graded-index optical fiber with a diameter of 0.04 centimeters is made by Nippon Sheet Glass Co., Selfoc Division, Osaka, Japan. For this commercially available fiber, $b = 0.3$ centimeters and $n_0 \cong 1.5$. If we assume that the graded-index mirrors 30 and 32 are separated by a distance $l_0 = 0.5$ centimeters, then for this particular fiber the parameter Q is found as follows (using, for example, $n_1 = 1.8$ for Nd:YAG):

$$Q = l_0/2K = n_0 l_0/n_1 b = (1.5 \times 0.5)/(1.8 \times 0.3) = 1.4 \tag{21}$$

Convex-Concave Resonator ($g_1 g_2 = 0.5, g_1 \geq 1$)

Figure 6:
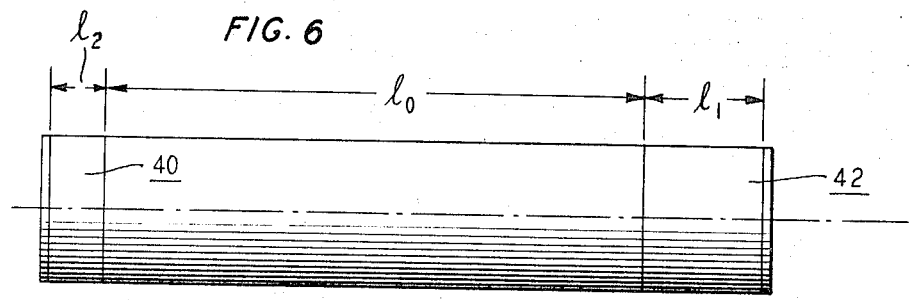
Figure 7:
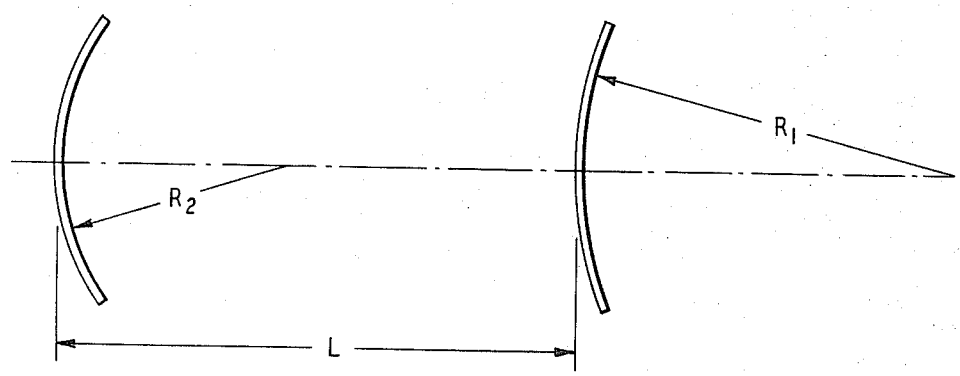

This configuration, which is described by R. B. Chesler and D. Maydan in *Journal of Applied Physics*, 43, p. 2,254 (1972), is advantageous for TEM$_{00}$ mode operation of solid-state lasers. Two graded-index mirrors 40 and 42 are used as shown in FIG. 6. The solution for stable operation of such an arrangement is obtained by assuming $g_1$ and Q, and solving (13) for the allowed set of values ($\theta_1, \theta_2$). We get $N$ and $g_2$ by substitution into (12) and the expression for $g_2$ [see (13)]. For the case $g_1 = 2$, the condition (15a) requires that $0 \leq g_2 \leq 0.5$. If we specify $Q = 1.4$, then the solution $g_1 g_2 = 0.5$ occurs at $\theta_1 = 3.73, \theta_2 = 2.35$, i.e., the mirror 40 is concave and the mirror 42 is convex.

One Spherical Graded-Index Mirror ($l_1 = l_2 = 0$)

Figure 8:
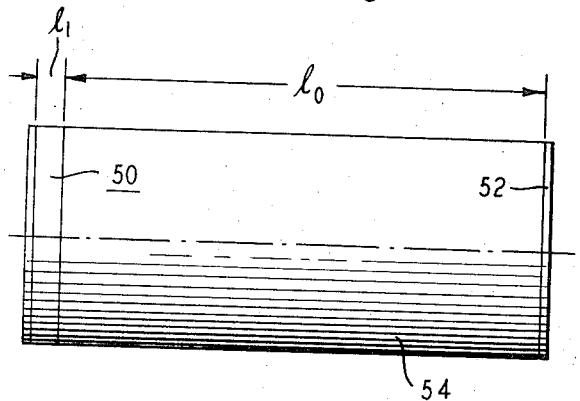
FIG. 8 shows a laser configuration including a single spherical mirror made in accordance with the present invention.
Figure 9:
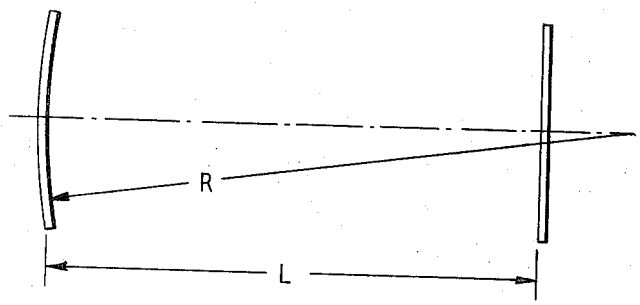
FIG. 9 represents the equivalent of the FIG. 8 arrangement.

The geometry is shown in FIG. 8, with the equivalent cavity in FIG. 9. One spherical graded-index mirror 50 and one flat conventional mirror 52 are used. Illustratively the latter is the high-reflectivity coated flat end of laser rod 54, with the graded-index mirror 50 attached to its other end. Upon setting $l_2 = 0$ in (12) and (13) we get the Fresnel number $$N = n_1 a_0^2 / [\lambda\{l_0 + K \tan(\theta/2)\}\cos(\theta/2)], \tag{22}$$

and the g-parameters $$g_1 = |1/\cos(\theta/2)| \times [1 - \{l_0 + K \tan(\theta/2)\}\sin\theta/2K], \tag{23a}$$

$$g_2 = \cos(\theta/2). \tag{23b}$$

(14a), (14b), (15a) and (15b) then give the stability condition and the constraint as $$0 \leq \cos\theta - 2Q\sin\theta \leq 1 \tag{24}$$

subject to $q \geq 0$ and $Q \geq -\tan(\theta/2)/2$.

Figure 10:
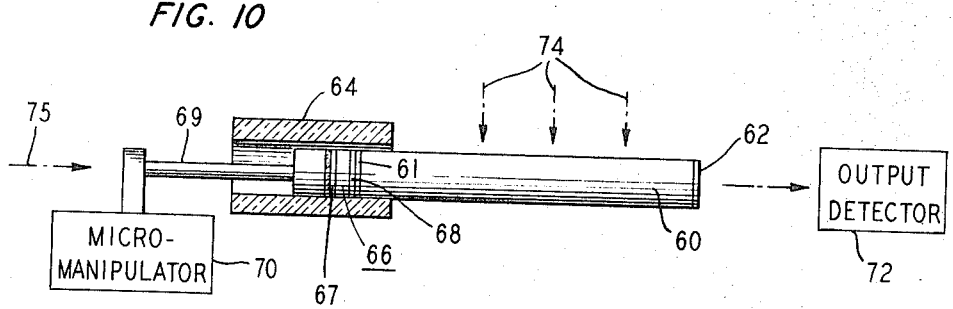
FIG. 10 is a more specific illustration of the FIG. 8 embodiment.

A specific illustrative version of the FIG. 8 arrangement is shown in FIG. 10 which includes a laser rod 60 made, for example, of Nd:YAG. In preparing the rod 60 for use in a laser configuration made in accordance with the principles of the present invention, the ends of the rod are polished flat (but importantly they need not be exactly parallel to each other).

Advantageously, the left-hand end of the laser rod 60 of FIG. 10 is antireflection coated (layer 61) in a manner known in the art. Additionally, the right-hand end of the rod 60 is coated with a high reflectivity material 62 that is, for example, 96 percent reflecting and 4 percent transmitting at the laser wavelength. An output may, therefore, be derived from the right-hand end of the rod.

With a drop of epoxy cement, a cylindrical sleeve 64, made for instance of glass, is cemented to the left-hand end of the rod 60. A graded-index spherical mirror element 66 made in accordance with the principles of this invention is attached to the left-hand end of the rod 60 within the sleeve 64.

Illustratively, the attachment of the element 66 to the rod 60 of FIG. 10 is accomplished by first cementing a supporting member 69 to the element 66 with a drop of epoxy. A drop of an index matching fluid for example glycerin, is put on the left-hand end of the rod 60 and then the mirror element 66 supported by the member 69 is inserted into the sleeve 64 and pressed against the left-hand end of the rod 60. The glycerin in combination with the sleeve are effective to maintain the element 66 and the member 69 in the depicted position.

By means of a micromanipulator 70 attached to the member 69, the angular position of the mirror element 66 of FIG. 10 is adjusted relative to the rod 60. This adjustment is made to maximize the laser power propagated through the coating 62, as indicated by output detector 72.

Once the mirror element 66 of FIG. 10 has been aligned with respect to the rod 60, a drop of epoxy is injected into the sleeve 64 to form a rigid permanent connection between the element 66 and the rod 60. At that point, the arm of the supporting member 69 may be snapped off.

The rod 60 of the compact laser assembly shown in FIG. 10 can be pumped from the side (schematically indicated by arrows 74).

It should be noted that in the illustrative version of FIG. 10 the lack of exact parallelism of the ends of the laser rod 60 is corrected for by adjusting the spherical mirror 66 with the micromanipulator 70, thereby aligning the cavity for maximum power output. However, if the ends of the rod 60 are polished exactly parallel (say, to within ten seconds of arc), and if likewise the ends of the spherical mirror element 66 are polished exactly parallel to the same precision, then the cavity depicted in FIG. 10 will be automatically aligned for maximum power output upon cementing the mirror 66 flat against the rod 60 with an index matching cement. In this case the supporting member 69 is omitted, since an adjustment of the mirror 66 is not needed.

Figure 11:
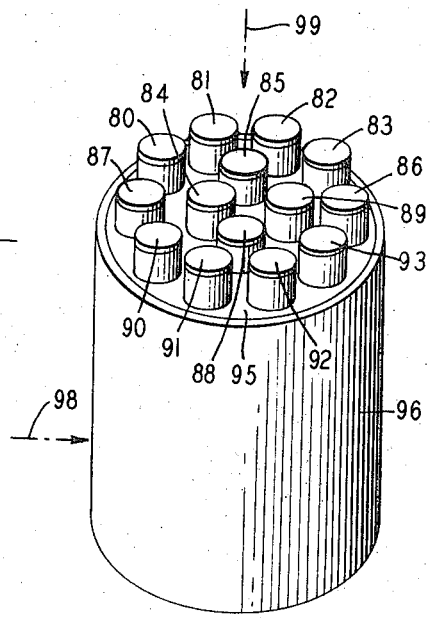
FIG. 11 shows a compact array of independent lasers each including a spherical mirror element that embodies the principles of this invention.

FIG. 11 shows another specific illustrative embodiment of the principles of the present invention. The depicted embodiment, which comprises a compact array of miniature resonators, includes a plurality of graded-index mirror elements 80 through 93 cemented to one flat end 95 of a solid-state active laser madium 96 which is, for example, a cylindrical rod of Nd:YAG. Advantageously, the end 95 is antireflection coated.

In accordance with the principles of this invention, the top end of each of the graded-index elements 80 through 93 of FIG. 11 is coated with a high-reflectivity material. In addition, the other (or bottom) flat end of the rod 96 is coated with a high-reflectivity material (for example, 96 percent reflecting and 4 percent transmitting). The end 95 and the bottom end of the rod 96 are to be polished flat and parallel to, say, a few seconds of arc. The illustrative multiple resonator structure may be either side pumped (arrow 98) or end pumped (arrow 99), in a manner known in the art.

One advantage of the FIG. 11 arrangement is that it makes possible the construction of a multiple resonator structure without the necessity of fabricating multiple individual laser rods. The arrangement so constructed comprises plural independent oscillators in which no coupling occurs between the modes of one oscillator and those of neighboring oscillators.

One practical way to construct the FIG. 11 array involves initially cementing the graded-index mirror elements 80 through 93 to each other with their optic axes generally parallel to each other. Significantly, it is not necessary that the optic axes of the cemented-together mirror elements 80 through 93 be exactly parallel to each other. Deviation of their optic axes by a few degrees from a reference axis is tolerable. Accordingly, as a practical matter, the elements may be initially aligned with respect to each other by eye or with a minimum of precision equipment.

After cementing, the top and bottom surfaces of the mirror elements are ground and polished to be optically flat and parallel to within, say, 10 seconds of arc. Then the top surfaces of the elements are coated with a high-reflectivity material and the array of elements is adhered to the rod 96, as described above.

Figure 12:
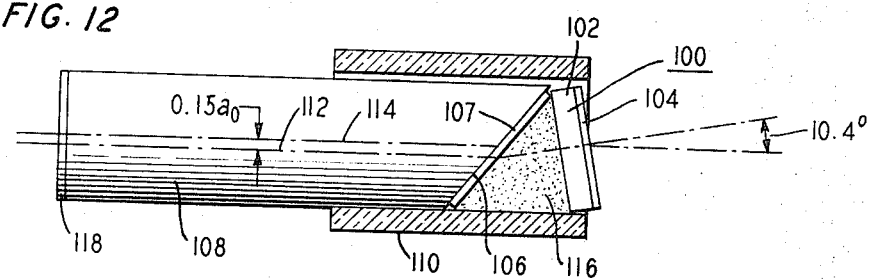
FIG. 12 shows a spherical mirror made in accordance with the present invention combined with the Brewster-cut end of a laser rod to achieve a polarized output from the rod.

FIG. 12 shows another illustrative arrangement embodying the principles of the present invention. The depicted structure includes a mirror element 100 that comprises a graded-index cylindrical segment 102 with a high-reflectivity coating 104 on the right-hand flat end thereof. The element 100 is shown positioned adjacent to the Brewster-cut end 106 of a laser rod 108 that is made, for example, of Nd:YAG. The end 106 is antireflection coated (layer 107). A sleeve 110 is fitted over the right-hand end of the rod 108.

In the FIG. 12 arrangement, the high-reflectivity coating 104 is, illustratively, partially transmissive at the laser wavelengths so that a portion of the energy in the laser resonator confined within the rod 108 is allowed to propagate through the element 100 to impinge upon a suitable output device (not shown).

In accordance with the principles of the present invention, the space between the mirror element 100 and the Brewster-cut end 106 of the rod 108 of FIG. 12 is filled with a conventional optical cement 116 whose index of refraction is selected to be the same or approximately the same as that of the material of the graded-index segment 102. For one particular graded-index fiber obtained from Nippon Sheet Glass, the index of refraction $n_o$ of the fiber material was 1.5. In that case, the depicted Brewster angle for a Nd:YAG rod combined with an optical cement having an index of refraction also equal to 1.5 is 50.2°. Accordingly, an axial ray emanating from the laser rod into the matching cement 116 and element 100 deviates only 10.4° upon refraction into the cement and element 100, as indicated in FIG. 12. This relatively small angle makes it possible to assemble the rod 108 and the mirror element 100 in an "in-line" structure in which the element 100 is only slightly tilted. As shown in FIG. 12, the element 100 is tilted 10.4° from a vertical axis. As a result of this tilt, the optic axis of the element 100 is aligned parallel to rays directed thereat from the rod 108.

The bundle of rays reflected from the element 100 back into the rod 108 of FIG. 12 may be represented by a center line 112 which is only slightly displaced from the centrally located longitudinal axis 114 of the rod 108. Specifically, the depicted displacement is equal to $a_0 \tan 39.8° \times \tan 10.4°$ or $0.15 a_0$, where $a_0$ is the radius of the rod 108. Assuming that the left-hand end of the laser cavity of FIG. 12 is defined by a conventional flat mirror element 118, such a relatively small axial displacement does not significantly decrease the power output obtainable from the illustrative configuration relative to the maximum power output capability of the structure.

It is to be understood that the above-described arrangements are only illustrative of the application of the principles of the present invention. In accordance with these principles, numerous other arrangements may be devised by those skilled in the art without departing from the spirit and scope of the invention. For example, although emphasis herein has been directed to graded-index spherical mirror elements combined with solid-state active laser media, it is to be understood that the elements may also be combined with nonsolid-state laser media. Such spherical mirror elements are of general applicability and not limited to use only in laser configurations. In addition, it is to be understood that such elements may be made from relatively large diameter graded-index rods as well as from miniature optical fibers.

What is claimed is:

1. In combination, an active laser medium, and two mirror elements positioned to define therebetween a resonant cavity that includes said medium, at least one of said elements comprising
a cylindrical segment of a graded-index material,
said segment having two spaced-apart flat faces perpendicular to a main longitudinal axis of said segment, the index of refraction of said segment being radially graded with respect to said longitudinal axis so as to decrease with increasing distance from said axis,
and a high-reflectivity material coated on the flat face of said segment that is farthest removed from said medium,
and wherein at least one additional mirror element is aligned with said one element at one end of said medium to form a multiple resonator structure, said additional mirror element comprising
a cylindrical segment of a graded-index material,
said segment having two spaced-apart flat faces perpendicular to a main longitudinal axis of said segment, the index of refraction of said segment being radially graded with respect to said longitudinal axis so as to decrease with increasing distance from said axis,
and a high-reflectivity material coated on the flat face of said segment that is farthest removed from said medium.

2. In combination, an active laser medium, and two mirror elements positioned to define therebetween a resonant cavity that includes said medium, at least one of said elements comprising
a cylindrical segment of a graded index material,
said segment having two spaced-apart flat faces perpendicular to a main longitudinal axis of said segment, the index of refraction of said segment being radially graded with respect to said longitudinal axis so as to decrease with increasing distance from said axis,
and a high-reflectivity material coated on the flat face of said segment that is farthest removed from said medium,
and wherein said medium comprises a rod having one end thereof cut at the Brewster angle and wherein said one element is positioned adjacent to said Brewster-cut end and aligned such that the longitudinal axis of said element is disposed with respect to the longitudinal axis of said rod at the angle at which an axial ray from said rod is refracted upon propagation into a material that has the same index of refraction as that at the center of said graded-index material, and wherein a material exhibiting said same index of refraction is interposed between said Brewster-cut end and said one element.

* * * * *